Aug. 13, 1968      B. H. BANKS      3,396,644
MOBILE MIXER AND PAVER
Filed Jan. 3, 1967      2 Sheets-Sheet 1
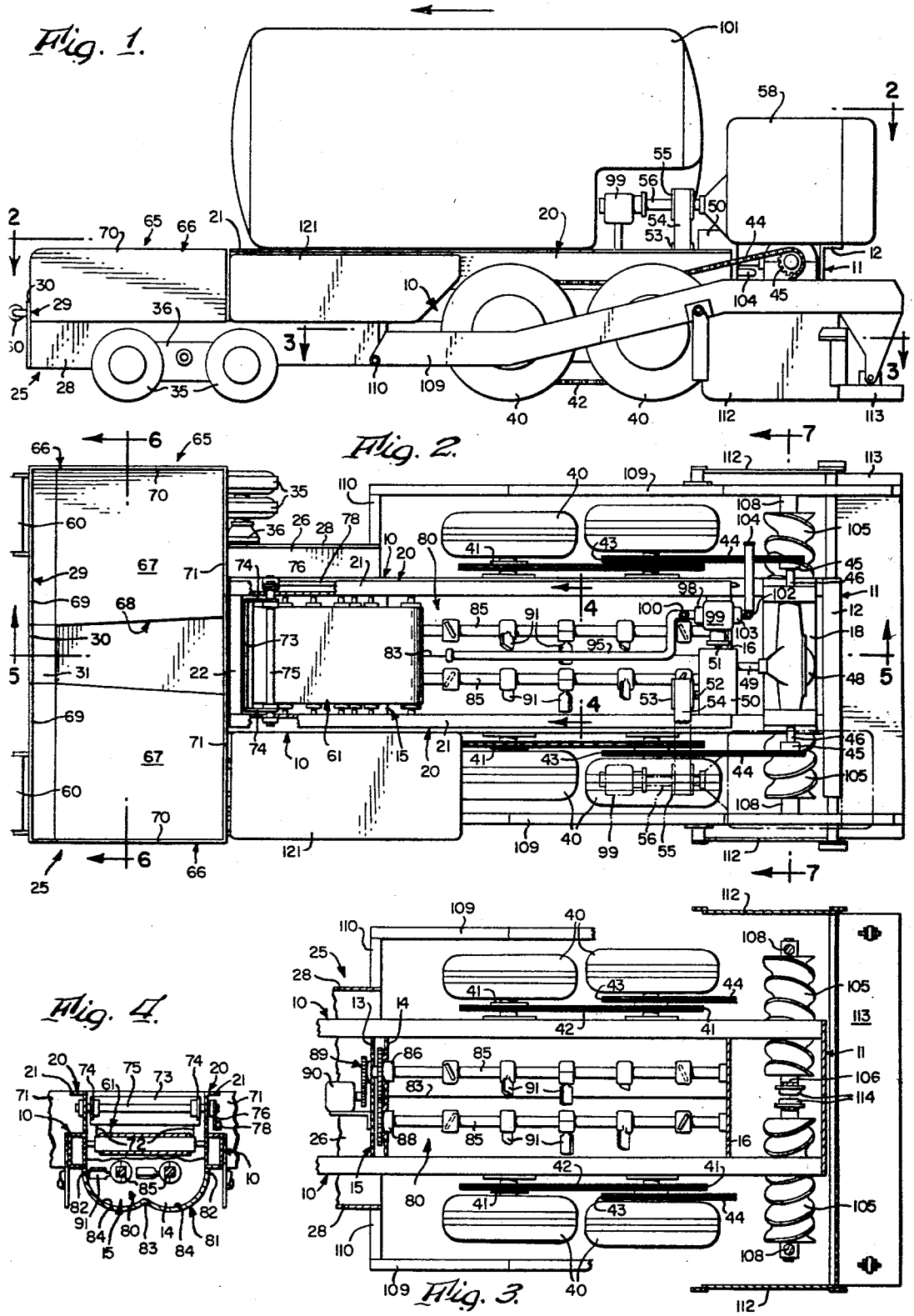

Aug. 13, 1968  B. H. BANKS  3,396,644
MOBILE MIXER AND PAVER
Filed Jan. 3, 1967 2 Sheets-Sheet 2
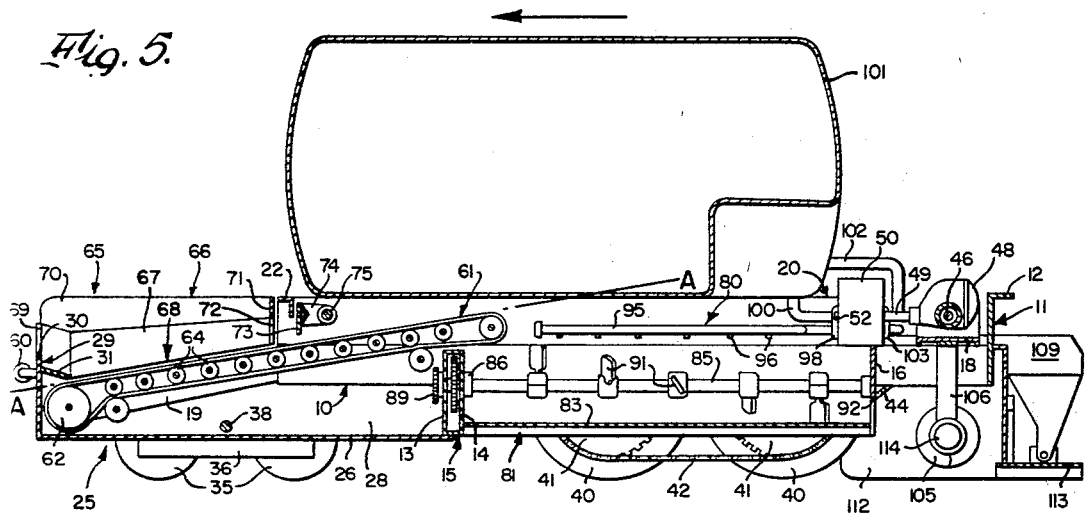
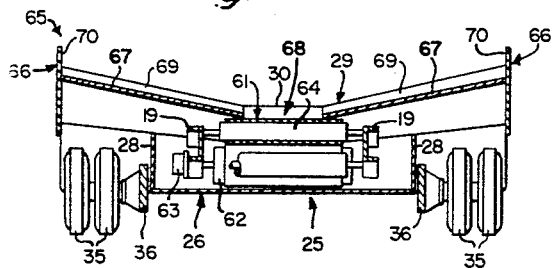 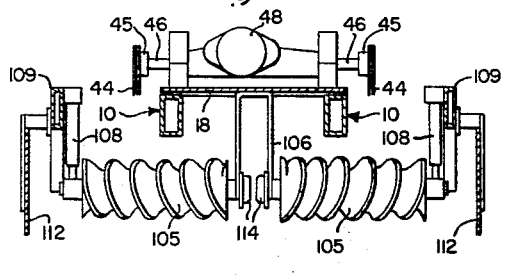
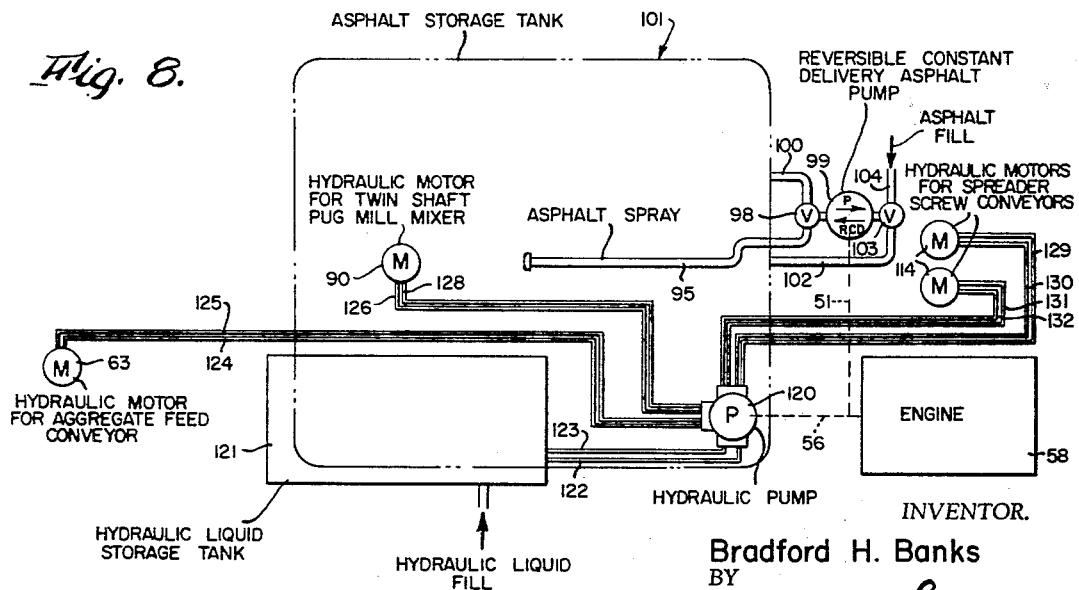
INVENTOR.
Bradford H. Banks
BY
Popp and Sommer
ATTORNEYS

United States Patent Office 3,396,644
Patented Aug. 13, 1968

3,396,644
MOBILE MIXER AND PAVER
Bradford H. Banks, Clarence, N.Y., assignor of one-half to Abert C. Litteer, Henrietta, N.Y.
Filed Jan. 3, 1967, Ser. No. 606,764
7 Claims. (Cl. 94—40)

ABSTRACT OF THE DISCLOSURE

Mobile mixers and pavers for secondary roads which mix metered aggregate, such as crushed stone being supplied from a dump truck, with liquid asphalt supplied from an overhead tank on the paver, and deposit the mixture on the road as a layer are now on the market, these having a front end aggregate supply hopper supplied by the dump truck while in transit, a high lift bucket elevator transferring the aggregate from the feed hopper to an overhead feed bin, a metering gate operating in conjunction with a feed belt controlling discharge from the bin into a mixing chamber, means in the mixing chamber adding liquid asphalt, and means agitating and propelling the mixture to a rear end discharge through which the mixture is deposited on the roadway. The subject machine eliminates the bucket elevator, overhead feed bin, and feed belt. This is accomplished (1) using a smooth surfaced endless belt to remove the aggregate from the supply hopper and which is set at an included angle to the horizontal less than the angle of repose of the aggregate for this purpose (2) discharging from this smooth surfaced endless belt directly into the forward end of the mixing chamber (3) arranging a strike off plate above the operative surface of this smooth surface endless belt so as to meter its discharge, this strike off plate preferably being above and returning the excess aggregate to the feed hopper, (4) arranging the bottom of the mixing chamber as close to the ground as practicable so as to reduce the elevation of the discharge end of the smooth surfaced endless belt conveyor. All of these numbered features, which summarizes the invention, not only greatly simplify the machine but also permit of the use of a much larger overhead liquid asphalt tank without rendering the machine top heavy.

FIG. 1 is a side elevational view of a mobile mixer and paver embodying the present invention. FIG. 2 is a top plan view, partly in section, with the asphalt supply tank removed and showing the engine in phantom, this view being taken on line 2—2, FIG. 1. FIG. 3 is a fragmentary horizontal section taken on line 3—3, FIG. 1. FIGS. 4, 5, 6 and 7 are vertical sections taken on the corresponding lines, FIG. 2. FIG. 8 is a diagrammatic representation of the hydraulic system for operating the various parts of the mobile mixer and paver.

Frame

The frame or chassis of the mobile mixer and paver is shown as comprising a pair of main longitudinal side beams 10 which are preferably of rectangular tubular or box form in cross section and are cross connected at their front ends by a vertical front plate 11 which rises a substantial distance above these longitudinal side beams and at its upper edge is provided with a forwardly projecting flange 12. Near its rear end the main longitudinal side beams 10 are shown as cross connected by the spaced front and rear walls 13, 14 of a box 15 housing certain gears as hereinafter described. The rear ends of these main longitudinal side beams 10 are also shown as cross connected by a vertical transverse plate 16, and also by a horizontal bed plate 18 for certain parts of the mechanism as hereinafter described. Inserted and secured within the front ends of each of these main longitudinal side beams 10 is a channel bar 19 which projects downwardly and forwardly therefrom, with reference to the line of travel of the machine (indicated by large arrows) at an angle of between 10° and 20° to the horizontal and preferably about 15°. The main frame also includes vertical longitudinal side plates 20 each of which has its lower edge welded to the top of a companion main longitudinal side bar 10 to form a continuation of its inner vertical surface and extends from the front end of this side beam to a point adjacent the vertical cross plate 16. Each of these vertical plates 20 extends a substantial distance above its main longitudinal side beam 10 and at its upper end is preferably reenforced along its upper edge by a flange 21. The upper front corners of these side plates 20 are preferably cross connected by an angle bar 22.

The frame also includes a bottom front hopper-like section indicated generally at 25 arranged under the front ends of the main longitudinal side beams 10 and the forwardly protruding longitudinal channel beams 19. This box-like forward portion is shown as comprising a bottom plate 26 secured at its rear end to the underside of the gear box 15 and as being substantially wider than the spacing of the main longitudinal side beams 10 and as having welded along its opposite fore-and-aft edges upstanding side plates 28. The forward end of the box-like bottom front portion 25 of the frame is closed by an upstanding vertical front cross plate 29 the upper edge 30 of which is at a sufficiently low elevation so that a standard dump truck (not shown) can dump aggregate over this top edge into the front end of the mobile mixer and paver as hereinafter described. A plate 31 is welded to the inside or rear side of this vertical front plate 29 to extend horizontally the full width of the box-like front portion 25 of the frame and inclines downwardly and rearwardly so as to insure that the aggregate so dumped into the mobile mixer and paver is received by an endless belt conveyor as hereinafter described.

Wheel support and drive

This box-like forward extension 25 of the main frame is supported by a pair of tandem dual rubber tired wheels 35 which are suitably journalled on stub shafts (not shown) as the front and rear ends of a walking beam or equalizing bar 36. Each of these walking beams is suitably journalled at its center on a horizontal cross shaft 38. These front tandem dual wheels 35 are not power driven.

The rear end of the frame is supported at its opposite sides by a pair of tandem rubber tired drive wheels 40 which are of substantially larger diameter than the front tandem wheels 35. Each of the drive wheels 40 is suitably journalled on a stub shaft (not shown) fixed to and projecting horizontally outwardly from the corresponding main longitudinal side beam 10 transversely of the line of movement of the machine. These wheels are provided with fixed sprockets 41 and these sprockets are interconnected by a drive chain 42 at each side of the machine. A drive sprocket 43 is fixed to each of the rearmost drive wheels 40 and is provided with a drive chain 44 driven by a small sprocket 45, these drive sprockets 45 being fixed to the opposite ends of differential cross shafts 46. These differential cross shafts 46 are journalled in a differential housing 48 which is supported on the bed plate 18 of the main frame. The conventional differential mechanism (not shown) within the differential housing 48 is driven by a power take-off shaft 49, FIG. 2, from gearing (not shown) within a gear box 50, this gear box being provided with another driven power take-off shaft 51. The input shaft 52 to the gear box 50 is provided with a drive pulley 53 connected by a belt 54 to a pulley 55 on the drive shaft 56 of the single engine 58 which is mounted on the left hand end of the top flange 12 of the rear vertical cross frame plate 11.

*Aggregate flow*

A pair of horizontal transverse rollers 60 are mounted on the front face of the front plate 29 and are spaced to engage the rear of the tires of the dump truck (not shown) dumping aggregate into the front end of the machine and to push this dump truck along while so depositing aggregate. This aggregate is deposited upon the upper surface of an endless flexible belt 61, it being a feature of the invention that the operative surface of this belt is smooth and uninterrupted, that is, it is unprovided with cleats, flights or other protuberances which would be assistive in engaging and moving the material dumped on the belt. The lower end of this belt passes around a power roller 62 driven by a hydraulic motor 63 and its upper operative stretch is supported by a series of idler rollers 64 which are arranged in succession in a plane which inclines upwardly and rearwardly with reference to the travel of the machine. It is an important feature of the invention that this plane, indicated by the line A—A, FIG. 4, is substantially less, with reference to the horizontal, than the angle of repose of the aggregate dumped thereon, this being necessary, not only to permit the smooth surfaced belt 61 to carry the aggregate upwardly when the machine is used to pave a horizontal stretch of roadway but also when it is used to pave a downhill stretch of roadway. The angle of repose of the crushed stone usually used as the aggregate is about 37° and the upward and rearward inclination of the upper stretch of the smooth surfaced belt 61 is preferably between about 10° and 20°, preferably about 15° in actual practice.

The ends of the lower group of these supporting rollers 64 are journalled on the webs of the frame channel bars 19 which form a downwardly and forward angular extension of the main longitudinal side beams 10. The upper group of these rollers 64 are suitably journalled on the side plates 20 which form an upward extension of these main longitudinal side beams 10. Accordingly the width of the smooth surfaced or uncleated flexible endless belt 61 is slightly less than the distance between the main longitudinal side beams 10 of the frame and which is substantially less than the width of the body of the dump truck (not shown). Accordingly, in order that the aggregate dumped from the dump truck reach the lower end of the upper stretch of the smooth flexible endless conveyer belt 61, a hopper 65 is provided at the front end of the paver, with the open upper end of the hopper being at a low elevation for such dumping purpose. This hopper 65 is in the form of side wings 66 each having a bottom 67 which inclines transversely of the machine downwardly toward and in position to discharge onto the top stretch of the lower end of the flexible endless conveyer belt 61 through a bottom opening 68 defined by the inboard edges of bottoms 67 and plate 31. These bottoms 67 are each provided with marginal walls 69, 70, 71 which rise from its front, side and rear edges, with rear marginal wall 71 being cut away at 72 to form a rear outlet alined with opening 67 for passage of the aggregate on belt 61. In accordance with conventional practice, these side walls can be mounted so as to be capable of having their outboard ends lifted, in the manner of a butterfly, to discharge any aggregate remaining therein thereon at the end of a day's run, such conventional mounting forming no part of the present invention and hence not being shown.

An important feature of the invention resides in the provision of a transversely extending, vertically adjustable strike off plate 73 above and coacting with the smooth uninterrupted top surface of the upper stretch of the endless flexible belt 61. This strike off plate is preferably arranged close to the outlet 72 from the feed hopper 65, near the center of this upper stretch of the belt, in rear of the cross angle frame bar 22 and is mounted at opposite ends on the outboard ends of arms 74 which are arranged close to the opposing faces of the vertical plates 20 which form upward extensions of the opposing faces of the main longitudinal side beams 10. The rearward ends of these arms 74 are fixed to a cross shaft 75 which is suitably journalled in these frame side plates 20 and which is oscillated, to adjust the vertical position of the strike off plate 73, by means of an adjusting arm 76 the outboard end of which is connected to a horizontal shipper rod 78, the forward end of which can be connected to any suitably control mechanism (not shown), convenient to the operator of the machine who is preferably seated alongside the engine 58 and in convenient control of the various hydraulic controls as hereinafter described.

This strike off plate 73 serves to strike off the aggregate carried up on the uninterrupted surface of the upper stretch of the belt of the flexible endless belt 61, the excess being held back in the feed hopper 65. Since this belt is driven at a speed controlled by the operator, as hereinafter described, it will be seen that this strike off plate 73 serves to meter the amount of aggregate discharged from the upper forward end of the belt and that this metering is under control of the operator either by raising or lowering the strike off plate 73 through manipulation of the shipper rod 78 or through increasing or decreasing the rate of travel of the endless flexible belt 61.

The metered aggregate is discharged over the upper rear end of the operative stretch of the flexible endless conveyer 61, which upper rear end also is at a low elevation above bottom opening 67 but below the upper end of the hopper. This discharged aggregate falls into a mixing chamber indicated generally at 80 which forms part of a pug mill mixer which is also supplied with a metered amount of liquid asphalt so that the aggregate is thoroughly mixed, in specified proportion, with liquid asphalt, the metered mixture being then deposited on the roadway from the rear end of the machine.

The forward wall of this mixing chamber is provided by the rear wall 14 of the gear box 15 and its bottom wall is in the form of a bottom plate 81 which is preferably of rounding W-form in cross section to provide outboard side walls 82 rising and joining the main longitudinal side beams 10 to form downward continuations of the inner opposing faces thereof, and a longitudinal central ridge 83 which forms two longitudinal side channels 84 in which the blades of the pug mill mixer and conveyer work, as hereinafter described. It is an important feature of the invention that the lowermost part of this bottom wall 81 be located close to the ground, it being desirable to provide about 6 inches clearance between this lowest part, namely the bottoms of the channels 84, and the ground. It is also important that this lowermost part of the bottom wall 81 be substantially below the axes of the main drive wheels 40 for the mixer and paver. This close-to-the-ground relation on this bottom wall 81 is important for securing the required depth of the mixing chamber without requiring that the rear end of the endless conveyer belt 61 be elevated more than is necessary. If it were necessary to raise this rear end of the endless conveyer belt 61 to an undue extent, it could not be in the form of a smooth surfaced conveyer belt since it would approach the angle of repose of the aggregate and would be ineffective in lifting the same. Under these circumstances cleats or other positive protrusions would be required and the metering plate 73 could not be used in direct cooperation with the upper surface of this belt because of jamming and tearing loose of the plate with a heavy deposit of aggregate from the truck.

The front wall of the mixing chamber is provided by the cross plate 16 and this plate journals the forward end of a pair of pug mill shafts 85. These pug mill shafts extend lengthwise of the line of travel of the machine and are arranged concentrically above the troughs 84 of the bottom wall 81 of the mixing chamber 80. Their forward ends are journalled on the rear wall 14 of the gear box 15 and extend into this gear box. Inter-meshing gears 86, 88 on these shafts in the gear box compel these shafts to rotate in unison and one of these shafts extends through the front wall 13 of the gear box 15 and is connected through gearing 89 with a hydraulic motor 90.

Within the chamber 80 each of the pug mill shafts 85 is provided with a series of paddles 91 each of which is set at an angle, in the manner of a propeller blade, so that each paddle propels the aggregate toward the rear end of the mixing chamber 80, the paddles acting in succession and discharging the material through an opening 92 at the rear end of the mixing chamber onto the roadway.

*Liquid asphalt supply*

While so being propelled through the mixing chamber 80 by the pug mill shafts and their propellers, a metered amount of asphalt is sprayed from an overhead spray tree 95. This spray tree comprises a horizontal pipe extending lengthwise of the line of travel of the machine centrally above the mixing chamber 80 and having a plurality of downwardly directed nozzles 96 along its length. The rearward end of this spray pipe connects through a three-way valve 98 to a reversible pump 99 which is shown as driven by the take off shaft 51. An inlet line 100 to the valve 98 connects with a large asphalt storage tank 101 which is mounted on the main frame 10 and covers the top of the mixing chamber 80. An outlet line 102 from this tank connects, via a three-way valve 103 with the reversible pump 99 and this valve 103 also connects with a supply line 104 which can supply liquid asphalt to the machine from a supply truck (not shown), such supply being delivered by the reversible pump 99 so as to refill the asphalt supply tank 101 as hereinafter described.

The mixed aggregate and asphalt discharged through the opening 92 at the rear end of the mixing chamber 80 is spread laterally over the roadway by a pair of horizontal spreader screws 105 which extend transversely of the line of movement of the machine at its rear end in coaxial relation to each other. Each of these screws is journalled at its inner end by means of a bracket 106 depending from the horizontal frame plate 18 and at its outer end by means of a support 108 secured to and depending from the rear end of a generally horizontal side arm 109. These side arms are arranged at opposite sides of the machine and are journalled, as indicated at 110, to the corresponding box-like front portion 25. Each of these side arms 109 carries, at its free end, a depending vertical side plate 112 extending lengthwise of the line of travel of the machine and the lower edge of which travels close to the roadway so that this plate forms a mold board for shaping the layer of material deposited on the roadway so as to have a square shoulder. The extreme outboard ends of the arms are jointly pivotally supported by a cross plate 113 which also carries a tamping mechanism which forms no part of the present invention and hence is not shown.

The spreading screws 105 are separately driven by hydraulic motors 114 and are preferably individually controlled as to speed so that more of the mixed asphalt aggregate deposited from the opening 92 at the rear end of the mixing chamber can be shifted to the right or to the left as may be required to produce a roadway which is wedge-shaped in cross section in order to obtain the desired pavement.

Referring to FIG. 8, the numeral 120 represents a hydraulic pump driven directly from the engine 58 through the drive shaft 56 and supplying oil for the operation of the various hydraulic motors as hereinafter described. This pump has a hydraulic liquid storage tank 121 and lines 122 and 123 connecting it with the pump 120 to supply the pump with operating fluid and to receive excess fluid therefrom. One pair of lines 124, 125 connect this pump with the motor 63 driving the flexible endless conveyer belt 61. Another pair of lines 126, 128 connect this pump 120 with the motor 90 driving the two pug mill mixer shafts 85. Two pairs of lines 129–132 connect this pump with the two motors 114 which separately drive the two spreader screws 105. The operation of all of these motors, as well as the operation of the asphalt pump 99 are under control of the operator of the machine in any suitable manner (not shown).

*Operation*

The overhead asphalt tank 101 is filled with asphalt prior to use, this being from a line 104 which is connected to withdraw asphalt from a supply truck (not shown). When so filling the tank, the three-way valves 98 and 103 are set so that the reversible pump 99 draws asphalt in through the line 104 via valve 103 and discharges it via valve 98 through line 100 into the asphalt tank 101. After the tank has been filled these valves 98, 103 are set so that the asphalt is withdrawn from the tank 101 via line 102 and valve 103 to the reversible pump 99 and thence flows via valve 98 to pipe 95 and spray nozzles 96 onto the aggregate being conveyed through the mixing chamber 80 by the paddles 91 on the pug mill shafts 85.

The three-way valves 98, 103 are set to a closed position, of course, until aggregate is flowing through the mixing chamber 80.

This aggregate is supplied from a conventional dump truck (not shown) the rear wheels of which are backed up against the rollers 60 at the front of the machine and the dump body of which is elevated by its driver so as to continuously drop aggregate in the form of crushed stone or the like into the hopper 65. While doing this the dump truck is being pushed along by the present combined mixer and paver and for this purpose the engine 58 is operatively connected to the tandem main drive wheels 40 of the machine by a drive train which comprises a pulley 55 on the engine drive shaft 56, belt 54, pulley 53 on shaft 52, gearing and gear box 50, power take off shaft 49, differential gearing in differential gear housing 48, output differential gear shafts 46, sprockets 45, chains 44, sprockets 43 fast to rearmost pair of drive wheels 40, sprockets 41 and chains 42 to sprockets 41 which are fast to the front pair of drive wheels 40.

The side wings 66 of the feed hopper 65 have sloping bottoms 67 which deliver the aggregate falling from the supply dump truck onto the upper stretch of the flexible endless conveyor belt 61. This upper stretch is unprovided with slats or other protuberances and is set at an angle substantially less than the angle of repose of the aggregate so that it withdraws a quantity of the aggregate from the bottom of the pile being maintained in the hopper 65 and moves it upwardly and rearwardly centrally of the machine. The aggregate so moved by this endless flexible conveyor belt 61 first encounters the strike off plate 73 which serves to hold back in the hopper 65 any excess aggregate and so that a metered quantity of aggregate emerges from under this strike off plate 73 on the upper surface of the flexible endless belt 61 at its upper end. This metered quantity is discharged over the upper end of the flexible endless conveyer belt into the forward end of the mixing chamber 80.

This aggregate received at the forward end of the mixing chamber 80 is immediately propelled rearwardly along the troughs 84 by the paddles 91 of the pug mill shafts 85, these paddles being set at an angle to effect such propulsion at the desired rate. These pug mill shafts are driven by the intermeshing gears 86, 88 in the gear box 15 and one of these shafts is driven by the gearing 89 from the motor 90.

As previously indicated, while this aggregate is so propelled rearwardly through the mixing chamber 80, it is being sprayed with asphalt from the nozzles 96 of the overhead spray tree 95 and by the time the aggregate reaches the discharge opening 92 a thorough admixture between the aggregate and the asphalt is obtained. This mixture is discharged through this opening 92 at the rear end of the mixing chamber by the paddles 91 of the pug mill shafts 85 and is deposited upon the roadway. The material so deposited then is engaged by the two spreader screws 105 which serve to distribute this material laterally outwardly from the center of the machine into a layer of the desired form. For this purpose the hydraulic motors 114 for these spreader screws can be set at different speeds so that in the event a wedge-shaped cross sectional layer is desired, for example, a greater quantity of asphalt and aggregate will be delivered to the thicker side of this layer. These screws act against the side plates 112 the lower edges of which travel close to the surface of the ground so that these plates serve to mold the sides of the layer being deposited into the form of sharp, rectangular, vertical shoulders, this being particularly important where several strips are being paved in contiguous relation to one another. These spreader screws 105 are supported on large side arms 109 which in turn are supported by a tamping mechanism supporting a rear cross plate 113 which supports the outboard rear ends of the arms, this tamping mechanism forming no part of the present invention and hence not being shown.

It will be seen that the present invention eliminates the necessity for an overhead feed bin for the aggregate and special means, such as the conventional horizontal feed belt and gate, for metering the discharge of aggregate from such a feed bin into the mixing chamber, as well as the need for providing a bucket conveyer to lift the aggregate from the supply hopper into this overhead feed bin. All these features of the prior art resulted in a combined mixer and paver the operating parts of which were necessarily at much higher elevation than those of the present mixer and conveyor so that less room was left for the overhead liquid asphalt supply tank which had to be much smaller to avoid making the combined mixer and paver top heavy.

Instead, with the present invention, an unslatted or smooth surfaced endless conveyor belt 61 is used to elevate the aggregate from the supply hopper 65 and, being unslatted, it necessarily is at a smaller included angle to the horizontal than the angle of repose of the aggregate (about 37°) since otherwise it would not convey the aggregate upwardly. Further it is necessary that this smooth surfaced endless conveyor belt be substantially less than this angle of repose so that the combined paver and mixer is practicable for use in normal uphill work along the road being resurfaced. Not only does the use of the smooth surfaced conveyor belt 61 remove and elevate the aggregate from the feed hopper 65 but also this type of belt renders practicable the use of the strike off plate 73 in conjunction with its upper operative surface at the outlet end of the feed hopper 65. Thus, this strike off plate holds back any aggregate in excess of the thickness of the layer which it permits to pass thereunder without difficulty, whereas if slats or protuberances were projecting upwardly from the upper operative surface of the flexible endless conveyor belt, these slats would tend to jam the material against the strike off plate 73 and tear it loose. Since the working surface of the flexible endless belt 61 is smooth surfaced, such jamming cannot occur and the metering plate 73 operates merely to hold back any aggregate which is so positioned as to be incapable of passing through the metering space between the strike off plate assembly 73 and the top smooth surface of the flexible endless conveyor belt 61.

Accordingly the aggregate reaches the discharge rearward end of the flexible endless conveyer belt 61 at a low elevation as compared with mixers and pavers now in use, and by arranging the bottom wall 81 of the mixing chamber 80 a minimum distance from the ground, this height of the rear end of the flexible endless conveyor belt 61 is sufficient to insure proper delivery of the required quantity of aggregate into the mixing chamber 80 to be propelled there along by the paddles 91 of the pug mill shafts 85 which finally discharge the aggregate (thoroughly mixed with asphalt from the overhead tree 95) from the machine onto the ground.

It will be seen that in essence the present invention is directed to the movement of the aggregate lengthwise of the combined paver and mixer at a very low elevation so as to not only eliminate the necessity for bucket conveyers, overhead feed bins, with metering feed belts and gate and unnecessarily high mixing chambers, but also to permit of carrying a much larger capacity overhead liquid asphalt supply tank 101 than has been possible heretofore, without making the machine top heavy. All this results in a greatly simplified machine having a low center of gravity notwithstanding an overhead asphalt supply tank having twice the capacity of conventional equivalent machines.

What is claimed is:

1. A mobile mixer and paver having a feed hopper at its front end with the open upper end of the hopper being at a low elevation and adapted to receive aggregate from a conventional dump truck, means forming a mixing chamber spaced a substantial distance rearwardly from said hopper, a conveyer for removing aggregate from said hopper, means in said mixing chamber for agitating and conveying the aggregate therein rearwardly and depositing the same on the roadway, and means supplying liquid asphalt to the aggregate being agitated and conveyed in the mixing chamber, wherein the improvement comprises: said conveyer being in the form of an endless belt having a smooth operative surface free from protuberances engageable with the aggregate being conveyed and with its upper operative stretch arranged at an upward inclination toward the rear of the mixer and paver with its lower front end arranged to pass under the mound of aggregate passing through the bottom opening in said hopper, to withdraw, lift and discharge this withdrawn aggregate from its upper rear end directly into the forward end of said mixing chamber, such upward inclination of the smooth surface endless belt being less than the angle of repose of the aggregate whereby the upper rear discharge end of said operative stretch of said belt also is at a low elevation above the bottom opening in said hopper but below the upper end of said hopper, with said conveyor being effective in continuously transferring aggregate from said hopper to the forward end of said mixing chamber.

2. A mobile mixer and paver as set forth in claim 1 wherein a strike off plate is arranged transversely above the operative stretch of the smooth surface endless belt conveyer to meter its discharge of aggregate into said mixing chamber, the smooth surface of said endless belt conveyer insuring against the conveyer jamming aggregate against such strike off plate and injuring the same.

3. A mobile mixer and paver as set forth in claim 2 wherein said hopper has a rear outlet, and said strike off plate is arranged close to said outlet, whereby the excess aggregate on the operative stretch of the smooth surface endless belt conveyer is held back in said feed hopper.

4. A mobile mixer and paver as set forth in claim 2 wherein said upward inclination of said operative stretch of said smooth surface endless belt conveyer is at an included angularity of between about 10° and 20° with reference to the horizontal.

5. A mobile mixer and paver as set forth in claim 2 wherein said upward inclination of said smooth surface endless belt is at an included angle of about 15° with reference to the horizontal.

6. A mobile mixer and paver as set forth in claim 1 additionally including a frame supporting said feed hopper, conveyer, means forming a mixing chamber and liquid asphalt supplying means, ground engaging drive wheels supporting opposite sides of said frame, an engine, means operatively connecting said engine with said drive wheels to drive the same, the bottom of said means forming said mixing chamber means being below the axes of said drive wheels.

7. A mobile mixer and paver as set forth in claim 1 wherein said bottom of said mixing chamber means has about six inches clearance from the roadway being paved.

References Cited

UNITED STATES PATENTS

| | | | |
|---|---|---|---|
| 2,169,406 | 8/1939 | Cost | 94—40 |
| 2,546,907 | 3/1951 | Sherwood | 94—40 |
| 2,796,811 | 6/1957 | Barber | 94—46 |
| 3,016,809 | 1/1962 | McNeill | 94—46 |
| 3,206,174 | 9/1965 | Young | 94—46 X |

NILE C. BYERS, JR., *Primary Examiner.*